US009681656B1

(12) United States Patent
Minerva

(10) Patent No.: US 9,681,656 B1
(45) Date of Patent: Jun. 20, 2017

(54) METHOD OF PREVENTING OR MINIMIZING TRESPASSING OF A HUNTING TREE STAND AND AN APPARATUS THEREFOR

(71) Applicant: Glenn Minerva, North Huntingdon, PA (US)

(72) Inventor: Glenn Minerva, North Huntingdon, PA (US)

( * ) Notice: Subject to any disclaimer, the term of this patent is extended or adjusted under 35 U.S.C. 154(b) by 0 days.

(21) Appl. No.: 15/097,971

(22) Filed: Apr. 13, 2016

Related U.S. Application Data

(60) Provisional application No. 62/147,301, filed on Apr. 14, 2015.

(51) Int. Cl.
*A01M 31/02* (2006.01)
*E06C 7/00* (2006.01)

(52) U.S. Cl.
CPC ............. *A01M 31/02* (2013.01); *E06C 7/006* (2013.01)

(58) Field of Classification Search
CPC ................................ E06C 7/006; A01M 31/02
See application file for complete search history.

(56) References Cited

U.S. PATENT DOCUMENTS

| 3,311,195 | A | 3/1967 | Singer |
| 3,372,772 | A | 3/1968 | Singer |
| 4,181,195 | A | 1/1980 | Clarke |
| 5,343,977 | A | * | 9/1994 | Bryan | ..................... E06C 7/006 182/106 |
| 5,421,428 | A | 6/1995 | Ingles |
| 5,832,755 | A | 11/1998 | Crilly |
| 2005/0241199 | A1 | 11/2005 | Ghormley |
| 2007/0114096 | A1* | 5/2007 | Skipper | ................. A01M 31/02 182/116 |
| 2013/0342091 | A1* | 12/2013 | Walker | ................. H05K 5/0247 312/265.5 |

FOREIGN PATENT DOCUMENTS

FR 2822640 A1 * 10/2002 ............ A01M 31/02

* cited by examiner

*Primary Examiner* — Alvin Chin-Shue
(74) *Attorney, Agent, or Firm* — Nils H. Ljungman & Associates

(57) ABSTRACT

A method of preventing or minimizing trespassing of a hunting tree stand and an apparatus therefor. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

2 Claims, 7 Drawing Sheets

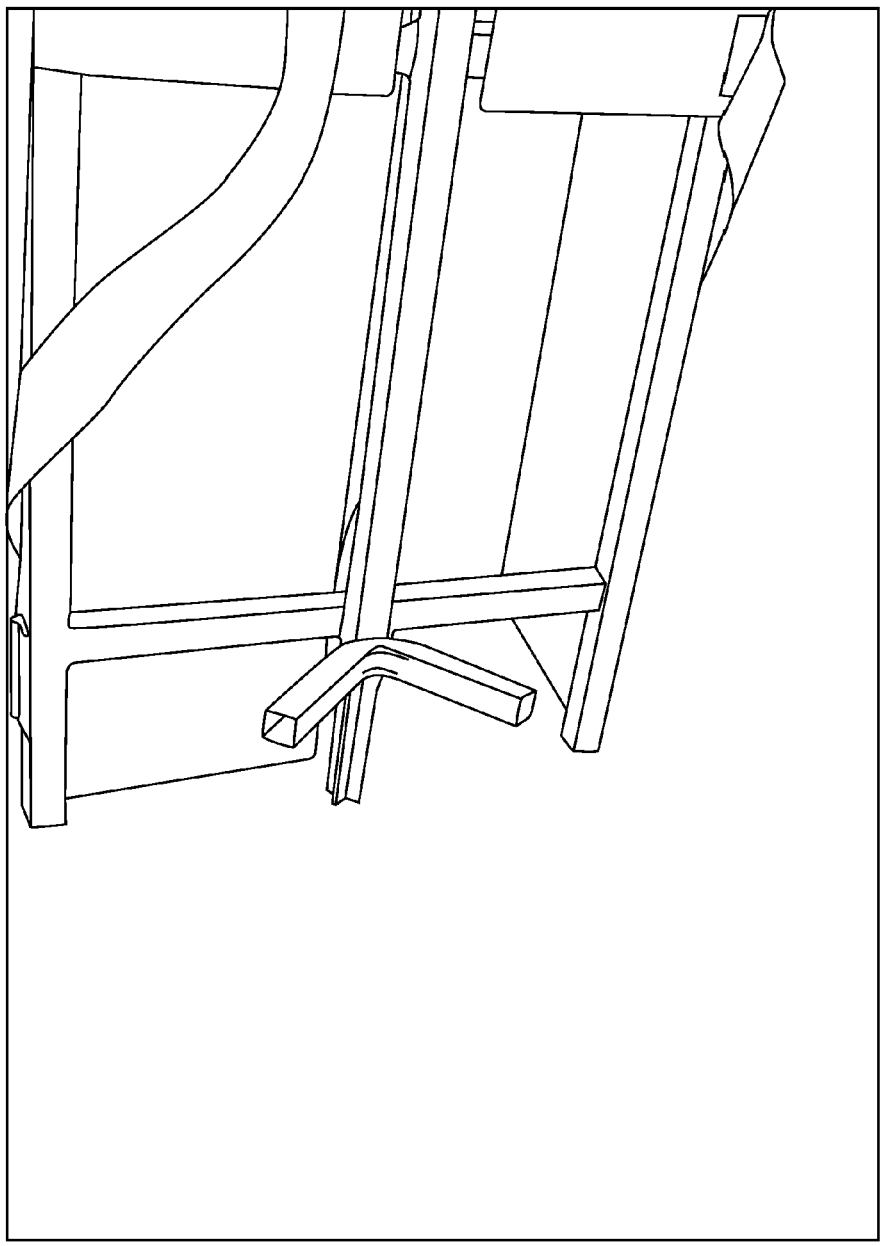

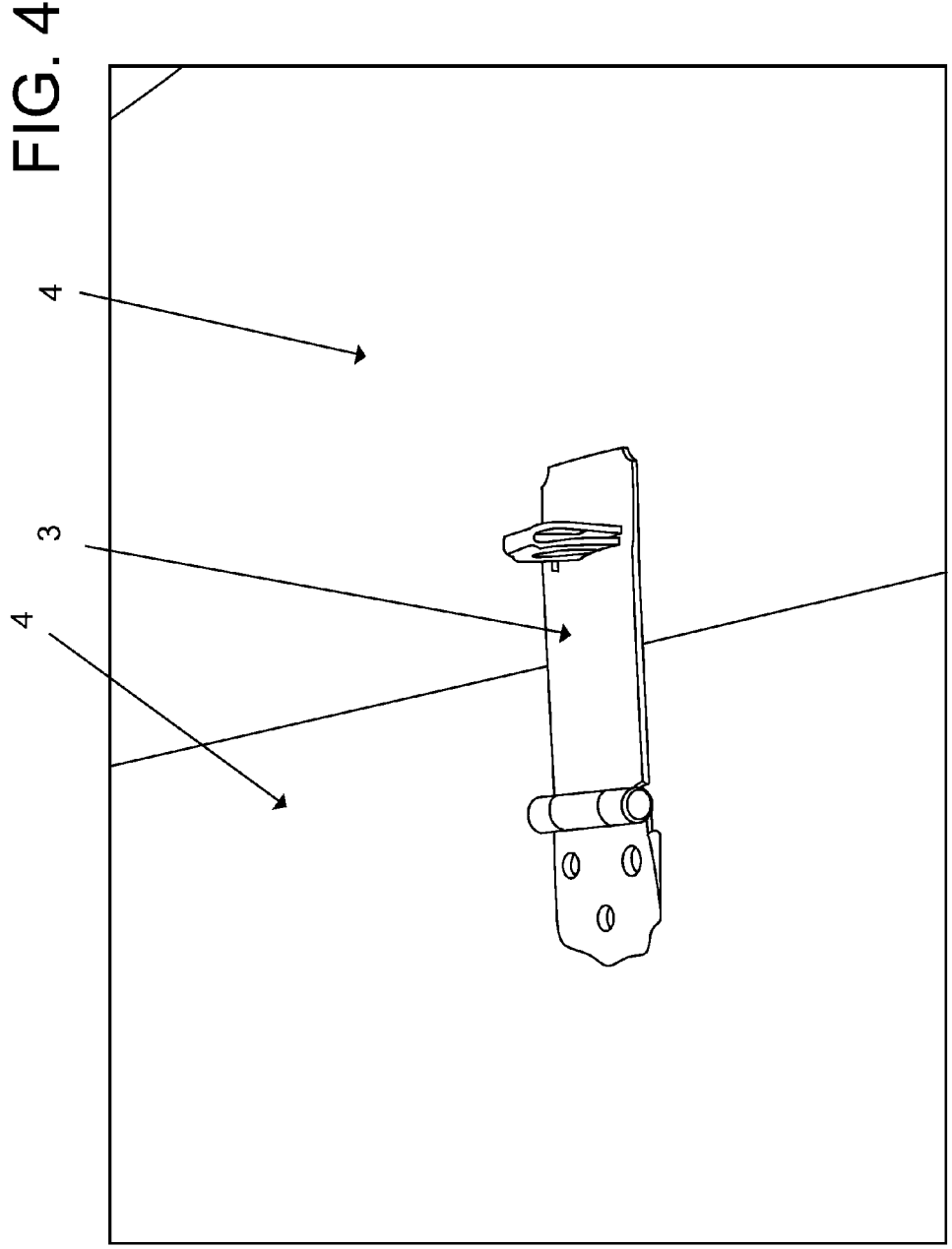

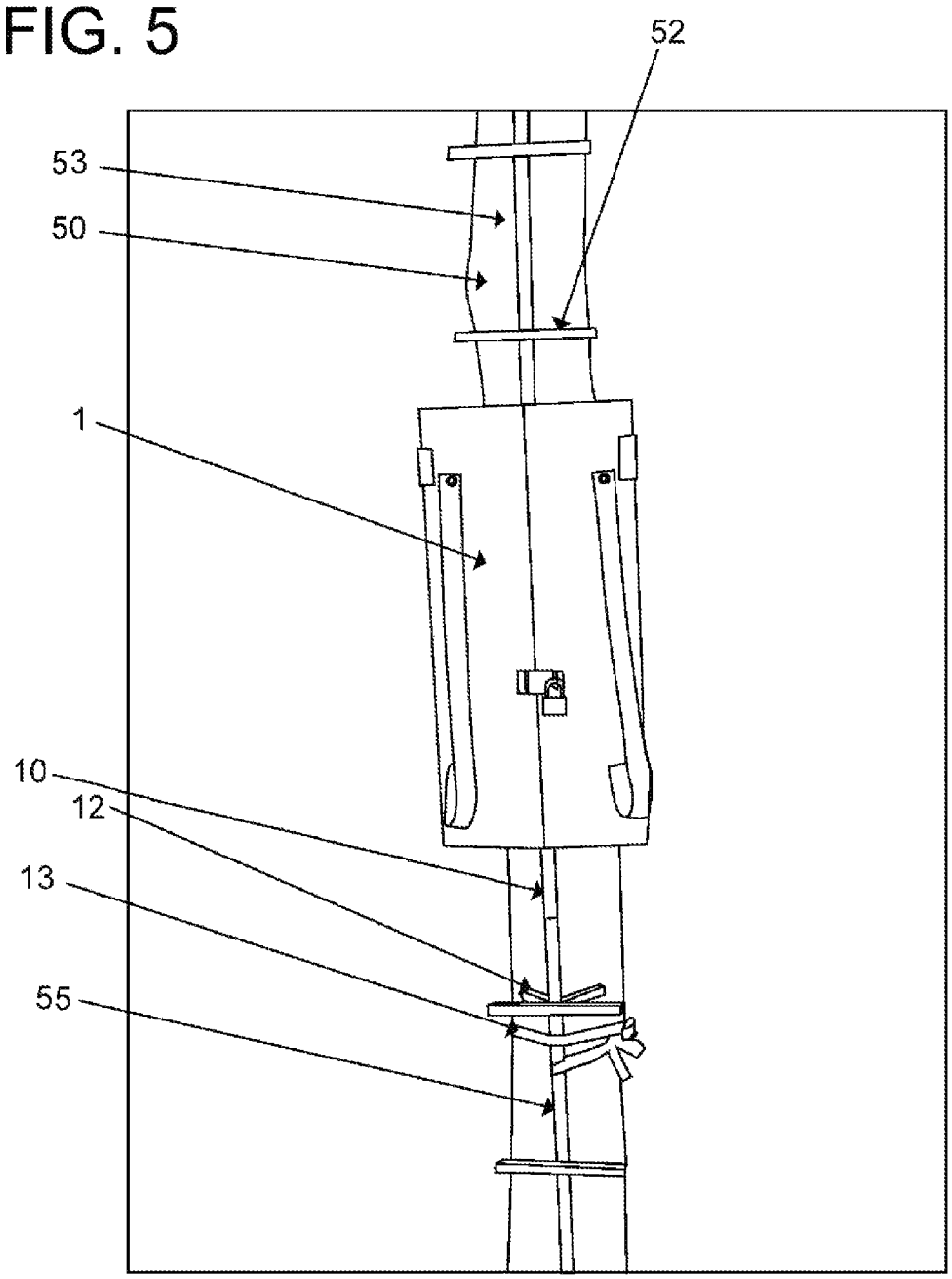

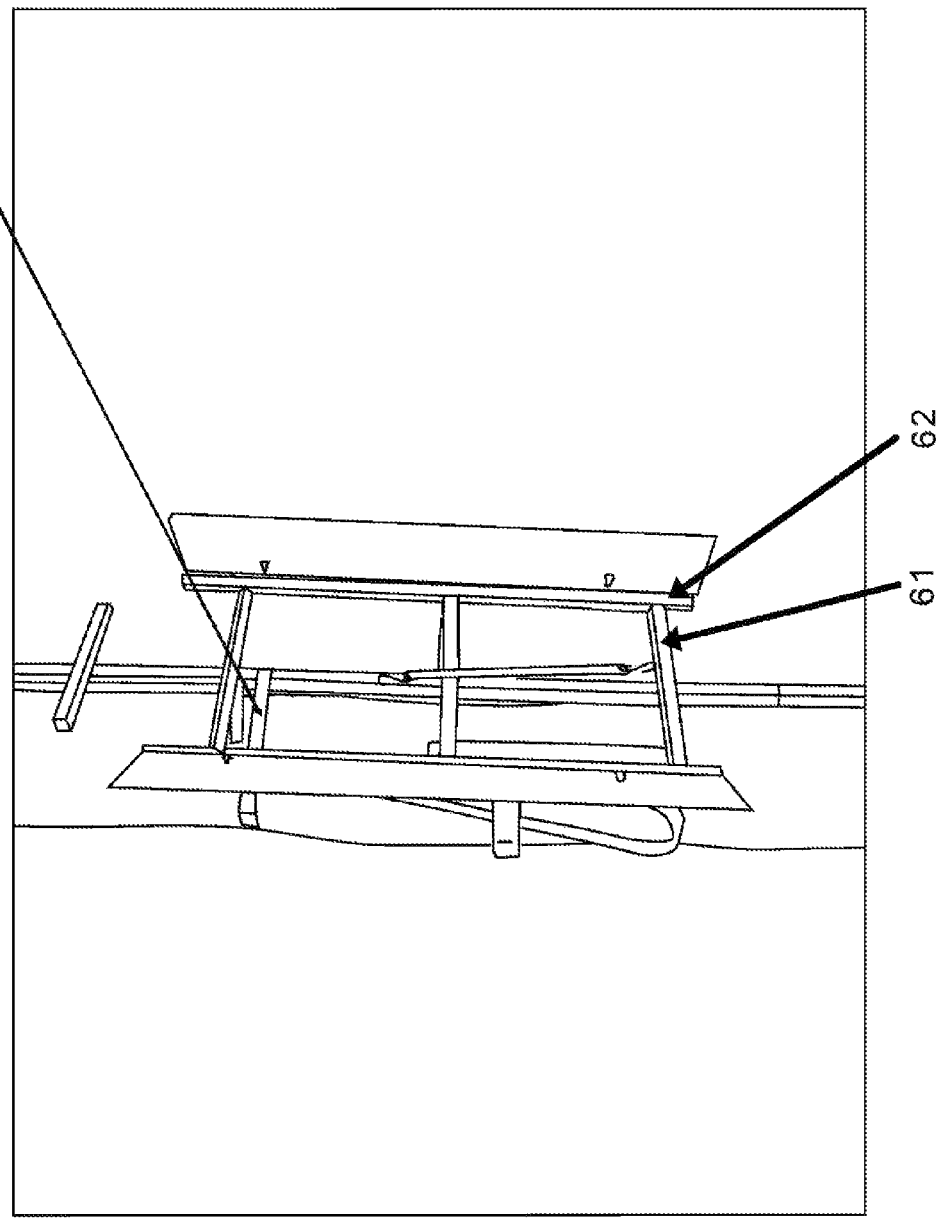

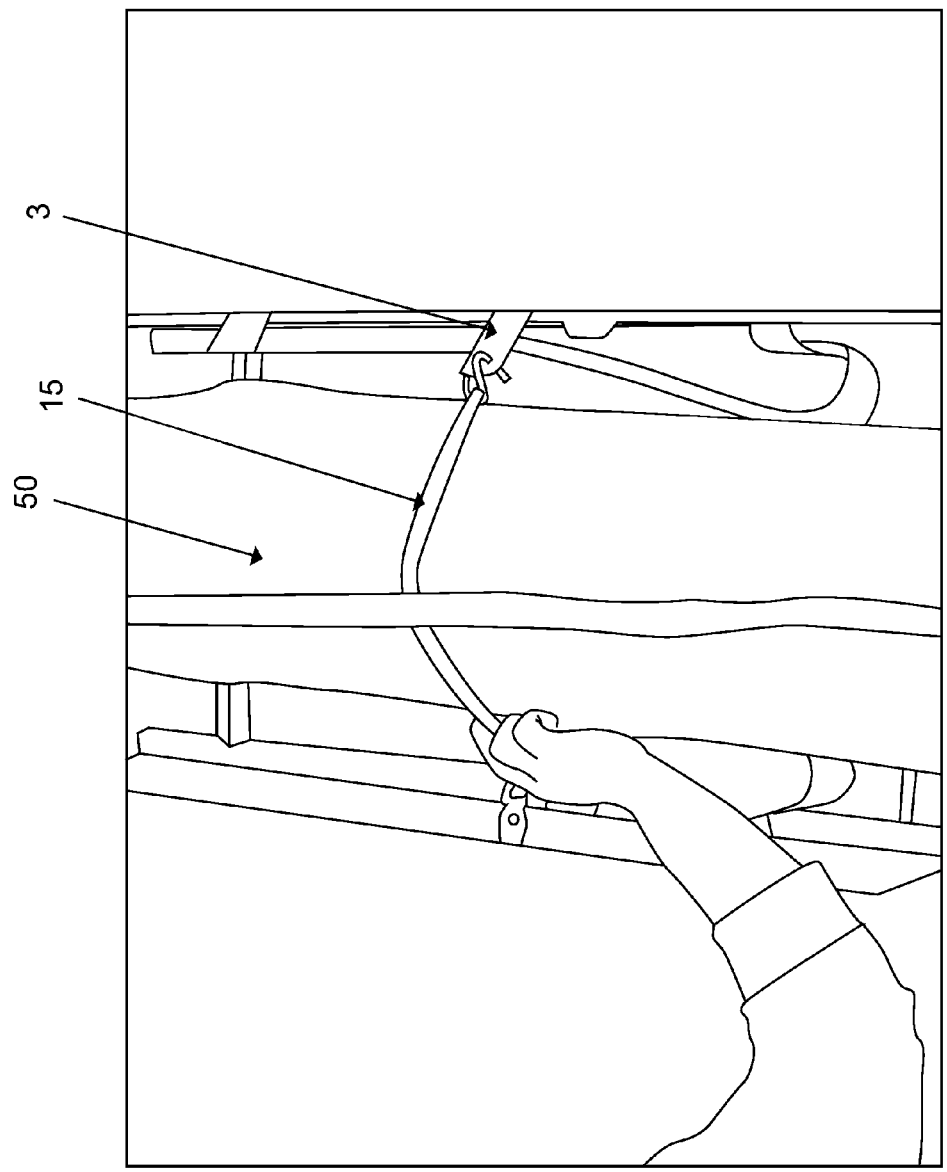

METHOD OF PREVENTING OR MINIMIZING TRESPASSING OF A HUNTING TREE STAND AND AN APPARATUS THEREFOR

The present application claims benefit of U.S. Provisional Patent Application No. 62/147,301, filed on Apr. 14, 2015.

BACKGROUND

1. Technical Field

The present application relates to a method of preventing or minimizing trespassing of a hunting tree stand and an apparatus therefor.

2. Background Information

Background information is for informational purposes only and does not necessarily admit that subsequently mentioned information and publications are prior art.

Hunters, during the off-season, usually for hunting deer, stake out locations where deer usually move through the landscape and/or forest, which requires a great deal of effort and time. Occasionally, another hunter will see the tree stand which the original hunter has constructed. The other hunter will then use the tree stand and often kill the deer that the original hunter had located the paths therefor.

Since a hunter who has constructed a tree stand for his own use in order to be able to hunt the quarry such as deer, has done so at great effort and expense, the hunter does not want another hunter to trespass on his tree stand and hunt the quarry. Therefore, the original hunter is desirous of preventing or at least minimizing the ability of another hunter to use the original hunter's tree stand to shoot the quarry, which the original hunter took so much time and effort and expense to construct.

In addition, many hunters often store hunting devices, such as rifles or bows, and/or accessories, such as cameras or binoculars, and/or other personal items, such as wallets or cell phones, in a tree stand during or between hunting outings. These valuable items can be targets of theft by trespassers. Further, the tree stand itself is usually a relatively expensive item, and it is not uncommon for trespassers to steal the tree stand from out of the tree.

SUMMARY

Therefore, the applicant wishes to provide a structure to prevent or at least minimize access to an original hunter's tree stand by a second or other hunter. The structure also can minimize or prevent theft of items in the tree stand, or theft of the tree stand itself, by other persons. Also, structure to be added to the tree stand arrangement could be sufficiently portable to the carried into the woods by a hunter.

The above-discussed exemplifications of the present invention will be described further herein below. When the word "invention" or "exemplification of the invention" is used in this specification, the word "invention" or "exemplification of the invention" includes "inventions" or "exemplifications of the invention", that is the plural of "invention" or "exemplification of the invention". By stating "invention" or "exemplification of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

FIG. 3 shows the back of the apparatus;

FIG. 4 shows a hasp on the doors of the apparatus in a closed position;

FIG. 5 also shows the apparatus of the present application disposed on a tree;

FIG. 6 shows the front doors of the apparatus; and

FIG. 7 shows the apparatus secured to a tree.

DESCRIPTION OF EXEMPLIFICATION OR EXEMPLIFICATIONS

Figure 1:
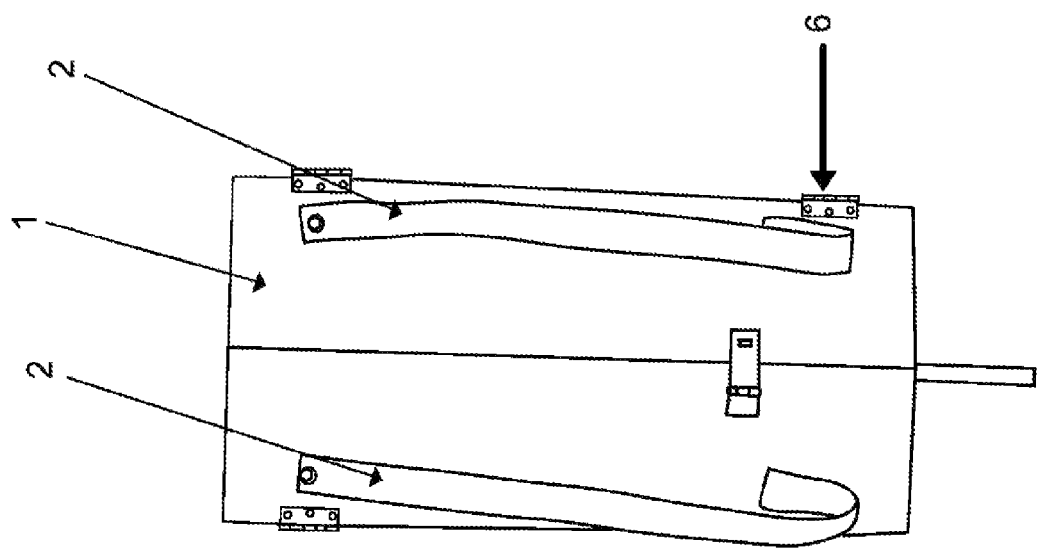
FIG. 1 shows the anti-trespassing apparatus according to one possible exemplification of the present application.

FIG. 1 shows the apparatus 1 for preventing or at least minimizing the prospect of a trespassing hunter using an original hunter's tree stand. In order to facilitate the carrying of the tree stand anti-trespassing apparatus 1, two straps 2 are fixed to one side of the anti-trespassing apparatus 1. FIG. 4 shows a close up view of doors 4, which are also called front doors and are visible in FIG. 1 with hinges 6. In FIG. 4 a hasp 3 is closed so that a padlock can be used to lock the front doors 4 of the anti-trespassing device 1 together to substantially prevent a trespasser from accessing the rungs contained therein, and thus minimize or prevent a trespasser from accessing a tree stand on which the anti-trespassing apparatus 1 is mounted in association with the tree stand.

Figure 2:
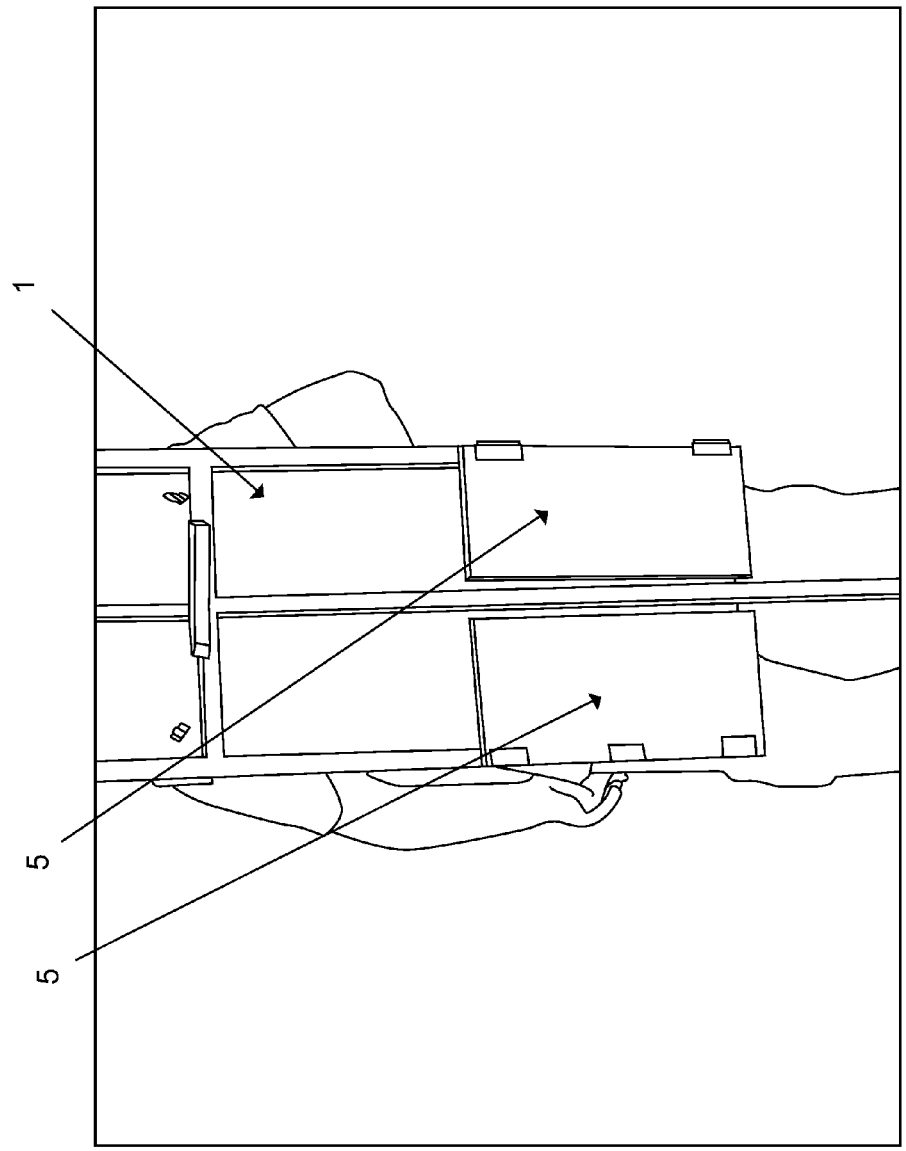
FIG. 2 shows a back view of the anti-trespassing apparatus disposed on a person's back.

FIG. 2 shows a back view of the anti-trespassing apparatus 1 disposed on the back of a person. As can be seen in FIG. 2, there are also doors 5, also called back doors, on the back of the anti-trespassing apparatus 1, in order to further minimize the ability of a trespassing hunter to defeat the anti-trespassing apparatus's function. The doors 5 on the back of the anti-trespassing apparatus 1 are about half the overall height of the anti-trespassing apparatus 1, such that the doors 5 block access to at least the lowest rung inside the anti-trespassing apparatus 1. The doors 5, in one exemplification, could also be longer, such as similar to the length of the doors 4, so that they extend higher on the back of the anti-trespassing apparatus 1, and thus enclose even more rungs to increase the ability of the anti-trespassing apparatus 1 to prevent a trespasser from using the back of the anti-trespassing apparatus 1 to defeat the anti-trespassing apparatus's function.

FIG. 3 shows the back of the anti-trespassing apparatus 1 with the frame standing vertically from the floor.

FIG. 5 shows the anti-trespassing apparatus 1 connected to two climbing sticks 53 and installed on a tree 50. The anti-trespassing apparatus 1 has a central member 10 that extends along the length of and partly projects below the major portion or cabinet-like portion of the anti-trespassing apparatus 1. The climbing sticks 53 are shown above and below the anti-trespassing apparatus 1. The climbing sticks 53 are made up of a central rod 55, transverse climbing rungs or pegs 52, and at least one angled piece 12. The central rod 55 of the upper climbing stick 53 is connected to an upper end (not shown) of the central member 10, and central rod 55 of the lower climbing stick 53 is connected to a lower end of the central member 10. As seen in FIG. 3, another angled piece 12, like the angled piece 12 shown in FIG. 5, is welded to the central member 10 of the anti-trespassing apparatus 1. The angled pieces 12 are designed to rest against the tree 50, thereby steady both the climbing sticks 53 and the anti-trespassing apparatus 1 when positioned against the tree 50 in which a tree stand is installed. A strap 13 is also shown which holds or helps secure the lower climbing stick 53 to the tree 50, which also helps secure the anti-trespassing apparatus 1 to the tree 50. The strap 13 may be made of cloth or leather material, which may be reinforced with metal or similar fibers, or made of metallic material. The strap 13 may include a portion that permits the use of a padlock to lock the anti-trespassing apparatus 1 to the tree 50.

FIG. 6 shows the front doors 4 of the anti-trespassing apparatus 1 in an open state. The back doors 5 are closed during the time when the anti-trespassing apparatus 1 is locked so that a trespasser cannot easily use the bars which are the means of accessing the tree stand from the anti-trespassing apparatus 1. If the back doors 5 are locked, it is difficult for someone to use the anti-trespassing apparatus 1 to access the tree stand. The anti-trespassing apparatus 1 is secured to the tree 50 with a strap 16. The strap 16 holds the anti-trespassing apparatus 1 to the tree and, is constructed and positioned so that someone with a knife cannot easily cut the strap 16 or loosen the strap 16 from the anti-trespassing apparatus 1. Straps like the strap 16 may be reinforced with metal wire so that someone with a knife cannot easily cut the strap 16 or loosen the strap 16 from the tree. An alternative attachment mechanism could also be used to very securely attach or connect the anti-trespassing apparatus 1 to the tree. The frame of the anti-trespassing apparatus 1 is visible, which frame, in the embodiment shown in FIG. 6, includes two long members 62 and three shorter members 61, which shorter members 61 serve as rungs of a ladder to permit climbing. The central member 10 (see FIG. 5) is completely visible, and is essentially a third long member of the frame connected to the shorter members 61 and positioned between the two long members 62.

FIG. 7 shows a holding device 15, such as a bungee strap, which is attached to the doors 4 to keep them open when a hunter wishes to access his tree stand. In this manner the front doors 4 can be held open so that the hunter can easily climb up and down without concern of one of the front doors 4 swinging shut or being blown shut by wind. The holding device 15 keeps doors 4 from flapping or moving, which could be unsafe for a person climbing up or down, and which could make an undesired noise that could frighten away game to be hunted.

When using an installed anti-trespassing apparatus 1, the hunter unlocks a lock that is locking the front doors 4 shut. If the back doors 5 are also locked, the hunter unlocks the back doors 5 as well. The back doors 5 are normally locked or bolted or clasped so that a trespasser cannot climb up the lower rungs and then move his leg around to the back of the anti-trespassing apparatus 1 to place his feet on the rungs located behind the front doors 4 and inside the anti-trespassing apparatus 1. In other words, the rungs inside the anti-trespassing apparatus 1 can be completely enclosed by both the front doors 4 and the back doors 5 so that a trespasser has no access to these rungs. Once both the front doors 4 and the back doors 5 are unlocked, the back doors 5 can be pushed back away from the rungs inside the anti-trespassing apparatus 1. The tree 50 prevents any further movement of the back doors 5. In this manner there is room for the hunter to put his feet on the rungs inside the anti-trespassing apparatus 1. The front doors 4 can be swung out and back, and then held together by holding device 15. For example, a bungee strap with S-hooks could be hooked into the first part of the hasp 3 on one of the front doors 4, and then hooked into the second part of the hasp 3 on the other one of the front doors 4. When the hunter is done hunting and/or accessing his tree stand, the hunter locks the back doors 5 and then the front doors 4 shut, thereby minimizing or preventing trespassers from readily accessing his tree stand while he is gone to minimize or prevent unauthorized use of the tree stand, and to minimize or prevent theft of the tree stand and/or articles stored thereon.

U.S. Provisional Patent Application No. 62/147,301 filed Apr. 14, 2016 and having inventor Glenn Minerva, is incorporated by reference as of set forth in its entirety herein.

One feature or aspect of an exemplification is believed at the time of the filing of this patent application to possibly reside broadly in a method of preventing trespassing of a hunter tree stand made by one hunter by another, unauthorized, hunter, said method comprising: constructing a tree stand and ladder structure configured to permit access to said tree stand; and installing a door mechanism that minimizes access to foot supports on said ladder structure.

One feature or aspect of an exemplification is believed at the time of the filing of this patent application to possibly reside broadly in a method of hunting deer and/or other game from a hunting tree stand and preventing or minimizing trespassing of said hunting tree stand with a hunting tree stand anti-trespassing door structure 1 comprising: two long vertically, upon installation, disposed members spaced from one another at vertically, upon installation, disposed opposite sides of said hunting tree stand anti-trespassing door structure 1; two shorter horizontally, upon installation, disposed members spaced from one another at opposite top and bottom ends of said hunting tree stand anti-trespassing door structure 1; a first door 4 attached by hinges 6 to a first of said two long vertically disposed, upon installation, members; a second door 4 attached by hinges 6 to a second of said two long vertically disposed, upon installation, members; two shoulder straps 2 disposed on the same side of said anti-trespassing door structure 1 as said two doors 4; said two shoulder straps 2 being configured to permit carrying of said anti-trespassing door structure 1 by a person; a first of said two shoulder straps 2 being disposed adjacent hinges 6 of said second door structure 4; a second of said two shoulder straps 2 being disposed adjacent hinges 6 of said first door structure 4; a further long vertically disposed, in use, members disposed between said two long vertically disposed, in use, members; a further short horizontally disposed, in use, member disposed between the said long two long vertically disposed, in use, members; said further short horizontally disposed, in use, member configured to serve as at least one rung 52; said at least one rung 52 being configured to act as a support for a climbing foot; at least one angularly configured positioning peg 12 being disposed and attached on said further short horizontally disposed, in use, and configured to hold said door 4 against a tree 50 in use; a strap 15 configured to hold said door structure 1 to the tree 50; a hasp structure 3 being disposed and configured to lock said two doors 4 with a locking mechanism such as a padlock; and a lower set of climbing pegs 52; and a lower strap 13 to hold said lower climbing pegs 52 to a tree 50 and an upper, additional, set of climbing pegs 52 and an upper strap 15 to hold said upper climbing pegs 52 to a tree 50, or a single set of climbing pegs 52 configured to run up the tree 50 from the ground area to said door structure 1 or further to a tree stand; said method comprising: observing movement of the deer and/or other game in an area; choosing a location to set up a hunting tree stand in said area; carrying a hunting tree stand, said hunting tree stand anti-trespassing door structure 1, and climbing pegs 52, to the location chosen and choosing a tree 50 on which to install said hunting tree stand, said hunting tree stand anti-trespassing structure 1, and said climbing pegs 52; said step of carrying comprising engaging said straps 2 on said tree stand door structure 1 over the shoulders of a carrier person and carrying said tree stand door structure 1 to said tree 50 chosen for the installation of said hunting tree stand; installing said lower set of said climbing pegs 52 on the tree 50 up to a height which would be inconvenient for a trespasser to access said hunting tree stand door structure 1; carrying said hunting tree stand door structure 1 to said chosen tree 50 using said lower climbing pegs 52 when installed; positioning said hunting tree stand door structure 1 above the installed lower climbing pegs 52; adjusting the position of at least one angularly configured positioning peg 12 being disposed and attached on said further short horizontally disposed, in use, against the trunk of said tree 50; attaching said hunting tree stand door structure 1 to said tree 50; attaching an additional set of said climbing pegs 52 to the trunk of said tree 50 above said hunting tree stand door structure 1; installing a tree stand above the additional climbing pegs 52; climbing up on said rungs 52 of said tree stand door structure 1; testing said tree stand for stability; climbing down from said tree stand using said upper, additional, climbing pegs 52; climbing down from said additional set of said climbing pegs 52; testing said tree stand for stability; climbing down from said rungs 52 of said tree stand door structure 1; climbing down said lower climbing pegs 52 to a position convenient to close said doors 4 of said hunting tree stand door structure 1; closing said doors 4 of said hunting tree stand door structure 1; locking said doors 4 of said hunting tree stand door structure 1; said tree stand door structure 1 comprising sides disposed vertically on either side of said tree stand door structure 1 which vertical sides are sufficiently high and free of structures which could be used by a trespasser to climb around said tree stand door structure 1; climbing down said lower climbing pegs 52 to the ground; approaching, for hunting, said tree 50 with said installed tree stand door structure 1 and said installed tree stand; climbing up said lower climbing pegs 52 to said tree stand door structure 1; using a key or combination or other means and unlocking said locked doors 4; opening said doors 4 and permitting a user of said tree stand to climb up said rungs 52 of said tree stand door structure 1 by using the pegs 52 disposed behind said doors 4 when said doors 4 are closed and locked; climbing up said additional climbing pegs 52 above said tree stand door structure 1; placing oneself on the tree stand; observing deer and/or other game from said tree stand; upon sighting of deer and/or other game, shooting a projectile at said deer and/or other game; upon ending hunting, closing the doors 4 on said tree stand door structure 1; locking said doors 4 on said tree stand door structure 1; climbing down said lower, additional, set of climbing pegs 52 to a position convenient to close said doors 4 of said hunting tree stand door structure 1; and climbing down the remainder of said lower, additional, set of climbing pegs 52 to the ground.

Another feature or aspect of an exemplification is believed at the time of the filing of this patent application to possibly reside broadly in the hunting tree stand anti-trespassing door structure 1 used for the method, said hunting tree stand anti-trespassing door structure 1 comprising: two long vertically, upon installation, disposed members spaced from one another at vertically, upon installation, disposed opposite sides of said hunting tree stand anti-trespassing door structure 1; two shorter horizontally, upon installation, disposed members spaced from one another at opposite top and bottom ends of said hunting tree stand anti-trespassing door structure 1; a first door 4 attached by hinges 6 to a first of said two long vertically disposed, upon installation, members; a second door 4 attached by hinges 6 to a second of said two long vertically disposed, upon installation, members; two shoulder straps 2 disposed on the same side of said anti-trespassing door structure 1 as said two doors 4; said two shoulder straps 2 being configured to permit carrying of said anti-trespassing door structure 1 by a person; a first of said two shoulder straps 2 being disposed adjacent hinges 6 of said second door structure 4; a second of said two shoulder straps 2 being disposed adjacent hinges 6 of said first door structure 4; a further long vertically disposed, in use, members disposed between said two long vertically disposed, in use, members; a further short horizontally disposed, in use, member disposed between the said two long vertically disposed, in use, members; said further short horizontally disposed, in use, member configured to serve as at least one rung 52; said at least one rung 52 being configured to act as a support for a climbing foot; at least one angularly configured positioning peg 12 being disposed and attached on said further short horizontally disposed, in use, and configured to hold said door 4 against a tree 50 in use; a hasp structure 3 being disposed and configured to lock said two doors 4 with a locking mechanism such as a padlock; and a lower, additional, set of climbing pegs 52.

Yet another feature or aspect of an exemplification is believed at the time of the filing of this patent application to possibly reside broadly in a method of hunting deer and/or other game from a hunting tree stand and preventing or minimizing trespassing of said hunting tree stand with a hunting tree stand anti-trespassing door structure 1, said method comprising: observing movement of the deer and/or other game in an area; choosing a location to set up a hunting tree stand in said area; carrying a hunting tree stand, a hunting tree stand anti-trespassing door structure 1, and climbing pegs 52, to the location chosen and choosing a tree 50 on which to install said hunting tree stand, said hunting tree stand anti-trespassing structure 1, and said climbing pegs 52; installing a lower set of said climbing pegs 52 on the tree 50 up to a height which would be inconvenient for a trespasser to access said hunting tree stand door structure 1; carrying said hunting tree stand door structure 1 to said chosen tree 50 and using said lower climbing pegs 52 when installed; positioning said hunting tree stand door structure 1 above the installed lower climbing pegs 52; adjusting the position of at least one angularly configured positioning peg 12 being disposed and attached on said further short horizontally disposed, in use, against the trunk of said tree 50; attaching said hunting tree stand door structure 1 to said tree 50; attaching an additional set of said climbing pegs 52 to the trunk of said tree 50 above said hunting tree stand door structure 1; installing said tree stand above the additional climbing pegs 52; climbing up on rungs 52 of said tree stand door structure 1; testing said tree stand for stability; climbing down from said tree stand using said upper, additional, climbing pegs 52; climbing down from said additional set of said climbing pegs 52; testing said tree stand for stability; climbing down from said rungs 52 of said tree stand door structure 1; climbing down said lower climbing pegs 52 to a position convenient to close doors 4 of said hunting tree stand door structure 1; closing said doors 4 of said hunting tree stand door structure 1; locking said doors 4 of said hunting tree stand door structure 1; said tree stand door structure 1 comprising sides disposed vertically on either side of said tree stand door structure 1 which vertical sides are sufficiently high and free of structures which could be used by a trespasser to climb around said tree stand door structure 1; climbing down said lower climbing pegs 52 to the ground; approaching, for hunting, said tree 50 with said installed tree stand door structure 1 and said installed tree stand; climbing up said lower climbing pegs 52 to said tree stand door structure 1; using a key or combination or other means and unlocking said locked doors 4; opening said doors 4 and permitting a user of said tree stand to climb up said rungs 52 of said tree stand door structure 1 by using the pegs 52 disposed behind said doors 4 when said doors 4 are closed and locked; climbing up said additional climbing pegs 52 above said tree stand door structure 1; placing oneself on the tree stand; observing deer and/or other game from said tree stand; upon sighting of deer and/or other game, shooting a projectile at said deer and/or other game; upon ending hunting, closing the doors 4 on said tree stand door structure 1; locking said doors 4 on said tree stand door structure 1; climbing down said lower, additional, set of climbing pegs 52 to a position convenient to close said doors 4 of said hunting tree stand door structure 1; and climbing down the remainder of said lower, additional, set of climbing pegs 52 to the ground.

Still another feature or aspect of an exemplification is believed at the time of the filing of this patent application to possibly reside broadly in the method of hunting deer and/or other game from a hunting tree stand and preventing or minimizing trespassing of said hunting tree stand with a hunting tree stand anti-trespassing door structure 1, wherein said step of carrying comprising engaging straps 2 on said tree stand door structure 1 over the shoulders of a carrier person and carrying said tree stand door structure 1 to said tree 50 chosen for the installation of said hunting tree stand 1.

A further feature or aspect of an exemplification is believed at the time of the filing of this patent application to possibly reside broadly in a method of hunting deer and/or other game from a hunting tree stand and preventing or minimizing trespassing of said hunting tree stand with a hunting tree stand anti-trespassing door structure 1, said method comprising: observing movement of the deer and/or other game in an area; choosing a location to set up a hunting tree stand in said area; carrying a hunting tree stand, a hunting tree stand anti-trespassing door structure 1, and climbing pegs 52, to the location chosen and choosing a tree 50 on which to install said hunting tree stand 15, said hunting tree stand anti-trespassing structure 1, and said climbing pegs 52; said step of carrying comprising engaging straps 2 on said tree stand door structure 1 over the shoulders of a carrier person and carrying said tree stand door structure 1 to said tree 50 chosen for the installation of said hunting tree stand; installing a lower set of said climbing pegs 52 on the tree 50 up to a height which would be inconvenient for a trespasser to access said hunting tree stand door structure 1; carrying said hunting tree stand door structure 1 to said chosen tree 50 and using said lower climbing pegs 52 when installed; positioning said hunting tree stand door structure 1 above the installed lower climbing pegs 52; adjusting the position of said tree stand door structure 1, against the trunk of said tree 50; attaching said hunting tree stand door structure 1 to said tree 50; attaching an additional set of said climbing pegs 52 to the trunk of said tree 50 above said hunting tree stand door structure 1; installing said tree stand above the additional climbing pegs 52; climbing up on rungs 52 of said tree stand door structure 1; testing said tree stand for stability; climbing down from said tree stand using said upper, additional, climbing pegs 52; climbing down from said rungs 52 of said tree stand door structure 1; climbing down said lower climbing pegs 52 to a position convenient to close doors 4 of said hunting tree stand door structure 1; closing said doors 4 of said hunting tree stand door structure 1; locking said doors 4 of said hunting tree stand door structure 1; said tree stand door structure 1 comprising sides disposed vertically on either side of said tree stand door structure 1 which vertical sides are sufficiently high and free of structures which could be used by a trespasser to climb around said tree stand door structure 1; climbing down said lower climbing pegs 52 to the ground; approaching, for hunting, said tree 50 with said installed tree stand door structure 1 and said installed tree stand; climbing up said lower climbing pegs 52 to said tree stand door structure 1; using a key or combination or other means and unlocking said locked doors 4; opening said doors 4 and using said tree stand to climb up using said rungs 52 of said tree stand door structure 1 disposed behind said doors 4 when said doors 4 are closed and locked; climbing up said additional climbing pegs 52 above said tree stand door structure 1; placing oneself on the tree stand; observing deer and/or other game from said tree stand; upon sighting of deer and/or other game, shooting a projectile at said deer and/or other game; upon ending hunting: climbing down from said tree stand 51 using said upper, additional, climbing pegs 52; climbing down from said rungs 52 of said tree stand door structure 1; closing the doors 4 on said tree stand door structure 1; locking said doors 4 on said tree stand door structure 1; climbing down said lower, additional, set of climbing pegs 52 to a position convenient to close said doors 4 of said hunting tree stand door structure 1; and climbing down the remainder of said lower, additional, set of climbing pegs 52 to the ground.

Another feature or aspect of an exemplification is believed at the time of the filing of this patent application to possibly reside broadly in the hunting tree stand anti-trespassing door structure 1 used for the method, said hunting tree stand anti-trespassing door structure 1 comprising: two long vertically, upon installation, disposed members spaced from one another at vertically, upon installation, disposed opposite sides of said hunting tree stand anti-trespassing door structure 1; two shorter horizontally, upon installation, disposed members spaced from one another at opposite top and bottom ends of said hunting tree stand anti-trespassing door structure 1; a first door 4 attached by hinge structures 6 to a first of said two long vertically disposed, upon installation, members; a second door 4 attached by hinge structures 6 to a second of said two long vertically disposed, upon installation, members; at least one rung structure 52 disposed behind said doors 4 upon said doors 4 being closed; said at least one rung 52 being configured to act as a support for a climbing foot; a locking structure 3 being disposed and configured to lock said two doors 4 with a locking mechanism such as a padlock.

The components disclosed in the patents, patent applications, patent publications, and other documents disclosed or incorporated by reference herein, may possibly be used in possible exemplifications of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one exemplification of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various exemplifications may be used with at least one exemplification or all of the exemplifications, if more than one exemplification is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible exemplification of the present application . . . " may possibly not be used or useable in any one or more exemplifications of the application.

The sentence immediately above relates to patents, patent applications, patent publications, and other documents either incorporated by reference or not incorporated by reference.

The following patents, patent publications, and patent documents are incorporated herein except for the exceptions indicated herein: U.S. 2010/0236865; U.S. 2005/0241199; U.S. Pat. No. 8,132,647; U.S. Pat. No. 7,793,759; U.S. Pat. No. 6,880,674; U.S. Pat. No. 5,832,755; U.S. Pat. No. 5,441,126; U.S. Pat. No. 5,421,428; U.S. Pat. No. 5,343,977; U.S. Pat. No. 4,579,197; U.S. Pat. No. 4,181,195; U.S. Pat. No. 4,126,206; U.S. Pat. No. 3,968,857; U.S. Pat. No. 3,372,772; U.S. Pat. No. 3,311,195; U.S. Pat. No. 3,225,863; and U.S. Pat. No. 2,880,829.

U.S. Provisional Patent Application No. 62/147,301, filed on Apr. 14, 2015, having the title "A METHOD OF PREVENTING OR MINIMIZING TRESPASSING OF A HUNTING TREE STAND AND AN APPARATUS THEREFOR", is hereby incorporated by reference herein except for the exceptions indicated herein.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

Words relating to the opinions and judgments of the author of all patents, patent applications, patent publications, and other documents cited herein and not directly relating to the technical details of the description of the exemplifications therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more exemplifications of the patents, patent applications, patent publications, and other documents, are not considered to be incorporated by reference herein for any of the patents, patent applications, patent publications, and other documents cited herein.

The description of the exemplification or exemplifications is believed, at the time of the filing of this patent application, to adequately describe the exemplification or exemplifications of this patent application. However, portions of the description of the exemplification or exemplifications may not be completely applicable to the claims as originally filed in this patent application, as amended during prosecution of this patent application, and as ultimately allowed in any patent issuing from this patent application. Therefore, any statements made relating to the exemplification or exemplifications are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the exemplification or exemplifications, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The exemplifications of the invention described herein above in the context of the preferred exemplifications are not to be taken as limiting the exemplifications of the invention to all of the provided details thereof, since modifications and variations thereof may be made without departing from the spirit and scope of the exemplifications of the invention.

What is claimed is:

1. A hunting tree stand anti-trespassing door structure comprising:
    a frame comprising long members spaced apart and disposed essentially parallel to one another, and shorter members spaced apart and disposed essentially parallel to one another, which said shorter members are disposed transverse to said long members;
    said long members comprising first and second long members being disposed, upon installation of said hunting tree stand anti-trespassing door structure at a tree in which a hunting tree stand is located, essentially vertically and on opposite sides of said hunting tree stand anti-trespassing door structure;
    said shorter members comprising first and second shorter members being disposed, upon installation of said hunting tree stand anti-trespassing door structure at a tree in which a hunting tree stand is located, essentially horizontally to serve as climbing rungs to support a foot of a climber to permit climbing on said hunting tree stand anti-trespassing door structure;
    said first shorter member being disposed at a top end of said hunting tree stand anti-trespassing door structure, and said second shorter member being disposed at a bottom end of said hunting tree stand anti-trespassing door structure;
    a first door attached by hinges to said first long member;
    a second door attached by hinges to said second long member;
    at least one angled piece being configured and disposed, upon installation of said hunting tree stand anti-trespassing door structure at a tree in which a hunting tree stand is located, to steady or brace said frame on the trunk of a tree;
    a locking structure being configured to lock said first and second doors together to prevent unauthorized opening of said first and second doors and prevent access through said first and second doors to said shorter members of said frame;
    said shorter members further comprise a third shorter member being disposed, upon installation of said hunting tree stand anti-trespassing door structure at a tree in which a hunting tree stand is located, essentially horizontally and transverse to said first and second long members to serve as a climbing rung to support a foot of a climber to permit climbing on said hunting tree stand anti-trespassing door structure;
    said third shorter member being disposed between said first and second shorter members; and
    said hunting tree stand anti-trespassing door structure further comprising:
        first and second shoulder straps disposed on the same side of said anti-trespassing door structure as said first and second doors;
        said first and second shoulder straps being configured to permit carrying of said hunting tree stand anti-trespassing door structure by a person;
        said first shoulder strap being disposed adjacent said hinges of said first door;
        said second shoulder strap being disposed adjacent hinges of said second door;
        said long members further comprising a third long member being disposed between and essentially parallel to said first and second long members;
        said third long member being connected, upon installation of said hunting tree stand anti-trespassing door structure at a tree in which a hunting tree stand is located, to an upper climbing stick and a lower climbing stick, such that said third long member, said shorter members, said upper climbing stick, and said lower climbing stick together form a climbing structure to permit access to a tree stand; and
        said at least one angled piece being mounted on said third long member to project away from said third long member.

2. The hunting tree stand anti-trespassing door structure according to claim 1, wherein:
    said first and second doors comprise first and second front doors;
    said hunting tree stand anti-trespassing door structure further comprises first and second back doors;
    said first back door is attached by hinges to said first long member;
    said second back door is attached by hinges to said second long member;
    said first and second doors are attached on a front of said frame, and said back doors are attached on a back of said frame opposite said front of said frame;
    said first and second back doors are configured to be closed to enclose at least said second shorter member and a portion of said third longer member between said back doors and said front doors, and thus restrict or block access to at least said second shorter member from the back side of said frame, and thereby capable of preventing or minimizing an unauthorized user or trespasser from climbing on and past said hunting tree stand anti-trespassing door structure when said first and second doors are closed and locked;

said first and second back doors are configured to be opened to permit placement of a foot of a user on at least said second shorter member during climbing when said first and second doors are open; and said hunting tree stand anti-trespassing door structure further comprises a second locking mechanism configured to lock said first and second back doors together.

\* \* \* \* \*